(12) United States Patent
Ma et al.

(10) Patent No.: US 11,438,486 B2
(45) Date of Patent: Sep. 6, 2022

(54) 3D ACTIVE DEPTH SENSING WITH LASER PULSE TRAIN BURSTS AND A GATED SENSOR

(71) Applicant: QUALCOMM Incorporated, San Diego, CA (US)

(72) Inventors: Jian Ma, San Diego, CA (US); Biay-Cheng Hseih, Irvine, CA (US); Sergiu Radu Goma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/550,938

(22) Filed: Aug. 26, 2019

(65) Prior Publication Data

US 2021/0067662 A1 Mar. 4, 2021

(51) Int. Cl.
*H04N 5/222* (2006.01)
*G06T 7/579* (2017.01)
(Continued)

(52) U.S. Cl.
CPC ............. *H04N 5/2226* (2013.01); *G01C 3/32* (2013.01); *G03B 13/20* (2013.01); *G06T 7/579* (2017.01);
(Continued)

(58) Field of Classification Search
CPC ............. H04N 5/2226; H04N 5/23235; H04N 5/37457; G06T 7/579; G03B 13/20
(Continued)

(56) References Cited

U.S. PATENT DOCUMENTS 7,518,759 B2 4/2009 Hosier et al.
7,538,307 B1 5/2009 Lauxtermann
(Continued)

FOREIGN PATENT DOCUMENTS

CA 2482402 C * 9/2011 ............ G01N 21/39
CN 1233806 A 11/1999
(Continued)

OTHER PUBLICATIONS

Hondongwa D., et al., "Quanta Image Sensor (QIS): Early Research Progress," In Proc. 2013 Optical Society of America (OSA) Mtg. on Imaging Systems and Applications, Arlington, VA, Jun. 24-27, 2013, pp. 1-3.
(Continued)

*Primary Examiner* — Christopher S Kelley
*Assistant Examiner* — Ana Picon-Feliciano
(74) *Attorney, Agent, or Firm* — Qualcomm Incorporated

(57) ABSTRACT

This disclosure provides systems, methods, and apparatuses for sensing a scene. In one aspect, a device may illuminate the scene using a sequence of two or more periods. Each period may include a transmission portion during which a plurality of light pulses are emitted onto the scene. Each period may include a non-transmission portion corresponding to an absence of emitted light. The device may receive, during each transmission portion, a plurality of light pulses reflected from the scene. The device may continuously accumulate photoelectric charge indicative of the received light pulses during an entirety of the sequence. The device may transfer the accumulated photoelectric charge to a readout circuit after an end of the sequence.

28 Claims, 7 Drawing Sheets

(51) Int. Cl.
*G01C 3/32* (2006.01)
*G03B 13/20* (2021.01)
*H04N 5/232* (2006.01)
*H04N 5/3745* (2011.01)

(52) U.S. Cl.
CPC ..... *H04N 5/23235* (2013.01); *H04N 5/37457* (2013.01)

(58) Field of Classification Search
USPC .......................................................... 348/42
See application file for complete search history.

(56) References Cited

U.S. PATENT DOCUMENTS

| | | |
|---|---|---|
| 8,222,586 B2 | 7/2012 | Lee |
| 8,547,458 B2 | 10/2013 | Iwasawa |
| 8,638,382 B2 | 1/2014 | Itonaga et al. |
| 9,774,801 B2 | 9/2017 | Hseih et al. |
| 9,800,807 B2 | 10/2017 | Hicks |
| 10,129,377 B2 | 11/2018 | Evans |
| 10,466,342 B1 * | 11/2019 | Zhu ........................ G01S 17/10 |
| 2003/0058356 A1 | 3/2003 | Dicarlo et al. |
| 2005/0035381 A1 | 2/2005 | Holm et al. |
| 2005/0046715 A1 | 3/2005 | Lim et al. |
| 2005/0110884 A1 | 5/2005 | Altice, Jr. et al. |
| 2005/0110885 A1 | 5/2005 | Altice, Jr. et al. |
| 2005/0128327 A1 | 6/2005 | Bencuya et al. |
| 2007/0091190 A1 | 4/2007 | Iwabuchi et al. |
| 2008/0055441 A1 | 3/2008 | Altice |
| 2008/0083939 A1 | 4/2008 | Guidash |
| 2008/0170149 A1 | 7/2008 | Iida et al. |
| 2008/0309800 A1 | 12/2008 | Olsen et al. |
| 2009/0184349 A1 | 7/2009 | Dungan |
| 2009/0189234 A1 | 7/2009 | Mabuchi |
| 2010/0019130 A1 | 1/2010 | Lee |
| 2010/0060764 A1 | 3/2010 | Mccarten et al. |
| 2010/0276572 A1 | 11/2010 | Iwabuchi et al. |
| 2011/0101420 A1 | 5/2011 | Patel |
| 2011/0163223 A1 | 7/2011 | Guidash |
| 2011/0188054 A1 | 8/2011 | Petronius et al. |
| 2012/0050597 A1 | 3/2012 | Maeda et al. |
| 2012/0274744 A1 | 11/2012 | Wan et al. |
| 2013/0264467 A1 | 10/2013 | Hong et al. |
| 2013/0307103 A1 | 11/2013 | Lin et al. |
| 2013/0334403 A1 | 12/2013 | Kozlowski |
| 2014/0008520 A1 | 1/2014 | Raynor |
| 2014/0077057 A1 | 3/2014 | Chao et al. |
| 2014/0263959 A1 | 9/2014 | Hsu et al. |
| 2014/0320718 A1 | 10/2014 | Fan |
| 2015/0229861 A1 | 8/2015 | Yakemoto |
| 2015/0236065 A1 | 8/2015 | Eom |
| 2015/0271476 A1 * | 9/2015 | Wan ........................ G01B 11/25 348/46 |
| 2015/0373322 A1 | 12/2015 | Goma et al. |
| 2016/0360074 A1 | 12/2016 | Winer et al. |
| 2018/0164440 A1 | 6/2018 | Fried et al. |
| 2019/0072771 A1 * | 3/2019 | Hall ........................ G01B 5/0014 |
| 2019/0181171 A1 * | 6/2019 | Tadmor .............. H04N 5/37457 |
| 2019/0346537 A1 * | 11/2019 | Krelboim ............. G01S 17/931 |
| 2020/0154015 A1 * | 5/2020 | Lyu ........................ H04M 1/725 |

FOREIGN PATENT DOCUMENTS

| | | | |
|---|---|---|---|
| CN | 101188245 A | 5/2008 | |
| CN | 101753866 A | 6/2010 | |
| CN | 101821850 A | 9/2010 | |
| CN | 1953193 B | 12/2011 | |
| CN | 103367380 A | 10/2013 | |
| EP | 1493017 B1 * | 7/2012 | .......... H01S 5/0622 |
| JP | 2000165754 A | 6/2000 | |
| JP | 2007013089 A | 1/2007 | |
| JP | 2010165854 A | 7/2010 | |
| JP | 2012502469 A | 1/2012 | |
| KR | 19990083635 A | 11/1999 | |
| KR | 20070043656 A | 4/2007 | |
| WO | WO-2009051379 A2 | 4/2009 | |
| WO | WO-2014051306 A1 | 4/2014 | |
| WO | WO-2014064837 A1 | 5/2014 | |

OTHER PUBLICATIONS

Vogelsang T., et al., "Overcoming the Full Well Capacity Limit: High Dynamic Range Imaging Using Multi-Bit Temporal Oversampling and Conditional Reset," Rambus Inc., International Image Sensor Workshop, 2013, pp. 1-4.

International Search Report and Written Opinion—PCT/US2020/047644—ISA/EPO—dated Feb. 2, 2021.

* cited by examiner

3D ACTIVE DEPTH SENSING WITH LASER PULSE TRAIN BURSTS AND A GATED SENSOR

CROSS-REFERENCE TO RELATED APPLICATIONS

This Patent Application is related to the following United States utility patents: U.S. Pat. No. 9,774,801 B2, entitled "SOLID STATE IMAGE SENSOR WITH ENHANCED CHARGE CAPACITY AND DYNAMIC RANGE," filed on Dec. 5, 2014, and assigned to the assignee hereof; and U.S. Pat. No. 9,332,200 B1, entitled "PIXEL READOUT ARCHITECTURE FOR FULL WELL CAPACITY EXTENSION," filed on Dec. 5, 2014, and assigned to the assignee hereof. The disclosure of these patents are considered part of and are incorporated by reference in this Patent Application.

TECHNICAL FIELD

This disclosure relates generally to depth sensing systems and specifically to improving the speed and accuracy with which active depth systems generate depth information.

DESCRIPTION OF THE RELATED TECHNOLOGY

A device may determine distances of objects or surfaces in a scene using various active-or-passive depth sensing techniques. Passive depth sensing systems determine distances to objects in a scene based on ambient light reflected from the objects. Active depth sensing systems determine distances to objects in a scene by emitting pulses of light into a scene and analyzing corresponding light pulses reflected from objects in the scene. Some active depth sensing systems also may determine distances to objects in a scene by projecting a structured light (SL) pattern onto a scene and analyzing changes of the SL pattern reflected from objects in the scene. Active depth sensing systems typically employ either time-of-flight (ToF) techniques or SL techniques.

Some active depth sensing systems use an array of vertical cavity surface emitting lasers (VCSELs) that each emit a point of light (or "dot") through a diffractive optical element (DOE). The DOE is often a grating-type with a periodic structure to diffract the light emitted from the VCSELs so as to form 2D array patterns (or "dot patterns") on the scene. Some systems may then "stitch" the 2D arrays to form a pseudo-3D structured light pattern. The inherent pincushion distortion associated with such stitching may limit the resolution of the resultant image.

To eliminate this distortion and achieve higher-resolution images, an active depth sensing system may use a single DFB laser, rather than a VCSEL array, to emit a single point of light (or "dot") through a coded DOE (rather than a grating-type DOE). The coded DOE can shape and split the single point of light so as to project a distribution of light (or "dot pattern") onto the scene. At continuous wave or long pulse (e.g., on the order of milliseconds) operation, the light emitted from one DFB laser may have a lower power (and thus be less bright) than the light emitted from a VCSEL array, and may therefore be more susceptible to interference from ambient light (such as sunlight) than VCSEL arrays.

SUMMARY

The systems, methods and devices of this disclosure each have several innovative aspects, no single one of which is solely responsible for the desirable attributes disclosed herein.

One innovative aspect of the subject matter described in this disclosure can be used as a method of sensing a scene. In some implementations, the method can include illuminating the scene using a sequence of two or more periods, each period including a transmission portion during which a plurality of light pulses are emitted onto the scene and including a non-transmission portion corresponding to an absence of emitted light. The method also can include receiving, during each transmission portion, a plurality of light pulses reflected from the scene, and continuously accumulating photoelectric charge indicative of the received light pulses during an entirety of the sequence. The method also can include transferring the accumulated photoelectric charge to a readout circuit after an end of the sequence.

Another innovative aspect of the subject matter described in this disclosure can be implemented in an apparatus. In some implementations, the apparatus can include a memory and a processor coupled to the memory. The processor can be configured to illuminate the scene using a sequence of two or more periods, each period including a transmission portion during which a plurality of light pulses are emitted onto the scene and including a non-transmission portion corresponding to an absence of emitted light. The processor also can be configured to receive, during each transmission portion, a plurality of light pulses reflected from the scene and to continuously accumulate photoelectric charge indicative of the received light pulses during an entirety of the sequence. The processor also can be configured to transfer the accumulated photoelectric charge to a readout circuit after an end of the sequence.

Another innovative aspect of the subject matter described in this disclosure can be implemented in a device. The device can include means for illuminating a scene using a sequence of two or more periods, each period including a transmission portion during which a plurality of light pulses are emitted onto the scene and including a non-transmission portion corresponding to an absence of emitted light. The device also can include means for receiving, during each transmission portion, a plurality of light pulses reflected from the scene, and means for continuously accumulating photoelectric charge indicative of the received light pulses during an entirety of the sequence. The device also can include means for transferring the accumulated photoelectric charge to a readout circuit after an end of the sequence.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numerals refer to corresponding parts throughout the drawing figures.

DETAILED DESCRIPTION

Figure 1:
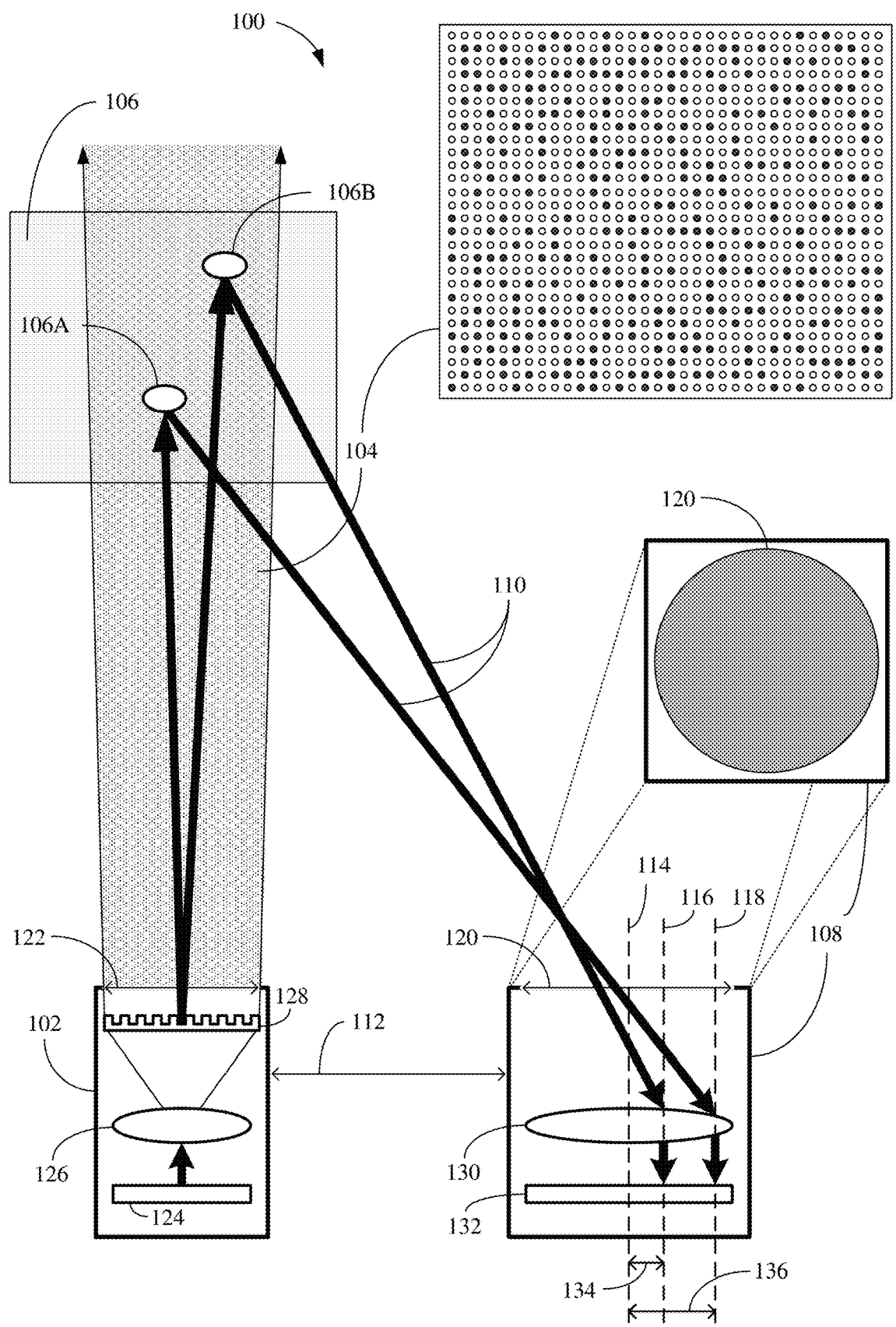
FIG. 1 shows a block diagram of an example structured light (SL) system.

The following description is directed to certain implementations for the purposes of describing the innovative aspects of this disclosure. However, a person having ordinary skill in the art will readily recognize that the teachings herein can be applied in a multitude of different ways. Aspects of the present disclosure relate to light projectors and include a 3D active depth sensing system that emits light in laser pulse train bursts and receives reflections of the emitted light at a gated sensor.

An active depth sensing system may emit light in a predefined distribution of points (or another suitable shape of focused light) into a scene, and the reflected light may be received by the active depth sensing system. Depths of objects in the scene may be determined by comparing the distribution of the received light and the distribution of the emitted light. In comparing the distributions, a portion of the predefined distribution for the emitted light may be identified in the received light. In the present disclosure, an active depth sensing system that projects a distribution of light (e.g., structured light (SL), such as a distribution of light points, a flood light, and/or other shapes) is referred to as a SL system (with a SL projector).

Denser distributions of light (such as additional light points or more instances of focused light in an area than for sparser distributions of light) may result in a higher resolution of a depth map or a greater number of depths that may be determined. However, the intensity of individual light points are lower for denser distributions than for sparser distributions, and thus denser distributions of light may be more susceptible to interference from ambient light than sparser distributions of light. Thus, a sparser distribution may be more suitable for daylight scenes (with more interference), and a denser distribution may be more suitable for indoor or nighttime scenes (with less interference).

Many devices use a SL system in different types of lighting (with different amounts of interference). For example, a smartphone may include an active depth sensing system for face recognition, and the smartphone may be used indoors and outdoors. Many devices also include a flood illuminator. A flood illuminator may project a diffuse light onto a scene so that enough light exists in the scene for an image sensor to capture one or more images of the scene. In one example, a device (such as a smartphone) that performs face recognition may first determine if a face to be recognized (and/or identified) exists in the scene. In some implementations, the device may capture a two-dimensional (2D) image using flood illumination and then use the 2D image in conjunction with a three-dimensional (3D) image to recognize (and/or identify) a face (if any) in the image. Specifically, a light projector of the device may include a flood illuminator to project IR light onto a scene so that an IR sensor may capture the scene, and the device may determine from the capture if a face exists in the scene. If a face is determined to exist in the scene, the device may then use an active depth sensing system (e.g., via one or more light projectors) for face recognition and/or liveness confirmation. In some implementations, the device may use a proximity sensor to determine whether a face is present in the scene. In some aspects, a user of the device may determine when to turn on the light projector. In some other aspects, the device may be configured to turn on the projector automatically. In these ways, the device may use a 2D image (e.g., captured via flood illumination) in conjunction with a 3D image to enhance the performance of the device.

As discussed above, an active depth sensing system may use a single DFB laser to emit a single point of light through a coded DOE, which may reduce distortion and achieve higher-resolution images as compared with a VCSEL array. However, due to a damage threshold for the DFB laser, at continuous wave or long pulse (e.g., on the order of milliseconds) operation, the light emitted from the DFB laser may have a lower power (and thus be less bright) than the light emitted from the VCSEL array, and may therefore be more susceptible to ambient light (such as sunlight).

Rather than emitting light in a continuous wave long pulse light, aspects of the present disclosure describe a device including a DFB laser configured to output a sequence of relatively short bursts of light pulses (a "pulse burst") that are each followed by a relatively long cooling period. Each pulse burst may include a small number of short light pulses. By repeating this pulse train burst and cooling cycle enough times, the device described herein may enable the single DFB laser to safely operate at a high enough power to illuminate a scene with brightness comparable to an array of VCSELs. Thus, SNR degradation from ambient light (i.e., noise) for the device may be reduced. In this way, aspects of the present disclosure may be used to enable, or otherwise improve, active depth sensing applications, such as, and not limited to: facial lock, facial recognition, facial modeling, animated emoji, user avatars, video conferencing, 3D modeling (such as automotive 3D modeling), 3D modeling for augmented reality (AR), gesture recognition, macro room imaging, among other appropriate applications. As one non-limiting example, aspects of the present disclosure may enable a mobile phone to capture a face of a user of the mobile phone (e.g., to enable the user to make a mobile payment) even while the user and the mobile phone are in bright conditions outdoors.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processes, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific implementations. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

FIG. 1 shows a block diagram of an example SL system 100. A SL system may emit light in a distribution of points (or another suitable shape of focused light). For purposes of discussion herein, the distribution of points may be referred to as a "pattern," a "SL pattern," a "dot pattern," or the like, and the pattern may be predefined or random. The points of light may be projected on to a scene, and the reflections of the points of light may be received by the SL system. Depths of objects in a scene may be determined by comparing the pattern of the received light and the pattern of the emitted light. In comparing the patterns, a portion of the predefined distribution for the emitted light may be identified in the received light. A SL system may project a distribution of light (such as a distribution of light points or other shapes) using a SL projector.

The SL system 100 may be used to generate depth information for a scene 106. For example, the scene 106 may include a face, and the SL system 100 may be used for identifying or authenticating the face. The SL system 100 may include a projector 102 and a receiver 108. The projector 102 may be referred to as a "transmitter," "projector," "emitter," and so on, and should not be limited to a specific transmission component. Throughout the following disclosure, the terms emitter, projector and transmitter may be used interchangeably. The receiver 108 may be referred to as a "detector," "sensor," "sensing element," "photodetector," and so on, and should not be limited to a specific receiving component.

While the disclosure refers to the distribution as a light distribution, any suitable signals at other frequencies may be used (such as radio frequency waves, sound waves, etc.). Further, while the disclosure refers to the distribution as including a plurality of light points, the light may be focused into any suitable size and dimensions. For example, the light may be projected in lines, squares, or any other suitable dimension. In addition, the disclosure may refer to the distribution as a codeword distribution, where a defined portion of the distribution (such as a predefined patch of light points) is referred to as a codeword. If the distribution of the light points is known, the codewords of the distribution may be known. However, the distribution may be organized in any way, and the present disclosure should not be limited to a specific type of distribution or type of signal or pulse.

The projector 102 may be configured to project or emit a distribution 104 of light points onto the scene 106. The white circles in the distribution 104 may indicate where no light is projected for a possible point location, and the black circles in the distribution 104 may indicate where light is projected for a possible point location. In some example implementations, the projector 102 may include one or more light sources 124 (such as one or more lasers), a lens 126, and a light modulator 128. The projector 102 also may include an aperture 122 from which the emitted light escapes the projector 102. In some implementations, the projector 102 may further include a diffractive optical element (DOE) to diffract the emissions from one or more light sources 124 into additional emissions. In some aspects, the light modulator 128 (to adjust the intensity of the emission) may comprise a DOE. In projecting the distribution 104 of light points onto the scene 106, the projector 102 may emit one or more lasers from the light source 124 through the lens 126 (and/or through a DOE or light modulator 128) and onto the scene 106. The projector 102 may be positioned on the same reference plane as the receiver 108, and the projector 102 and the receiver 108 may be separated by a distance called the baseline (112).

In some example implementations, the light projected by the projector 102 may be IR light. IR light may include portions of the visible light spectrum and/or portions of the light spectrum that is not visible to the naked eye. In one example, IR light may include near infrared (NIR) light, which may or may not include light within the visible light spectrum, and/or IR light (such as far infrared (FIR) light) which is outside the visible light spectrum. The term IR light should not be limited to light having a specific wavelength in or near the wavelength range of IR light. Further, IR light is provided as an example emission from the projector 102. In the following description, other suitable wavelengths of light may be used. For example, light in portions of the visible light spectrum outside the IR light wavelength range or ultraviolet light. Alternatively, other signals with different wavelengths may be used, such as microwaves, radio frequency signals, and other suitable signals.

The scene 106 may include objects at different depths from the SL system (such as from the projector 102 and the receiver 108). For example, objects 106A and 106B in the scene 106 may be at different depths. The receiver 108 may be configured to receive, from the scene 106, reflections 110 of the emitted distribution 104 of light points. To receive the reflections 110, the receiver 108 may capture an image. When capturing the image, the receiver 108 may receive the reflections 110, as well as (i) other reflections of the distribution 104 of light points from other portions of the scene 106 at different depths and (ii) ambient light. Noise also may exist in the captured image.

In some example implementations, the receiver 108 may include a lens 130 to focus or direct the received light (including the reflections 110 from the objects 106A and 106B) on to the sensor 132 of the receiver 108. The receiver 108 also may include an aperture 120. Assuming for the example that only the reflections 110 are received, depths of the objects 106A and 106B may be determined based on the baseline 112, displacement and distortion of the light distribution 104 (such as in codewords) in the reflections 110, and intensities of the reflections 110. For example, the distance 134 along the sensor 132 from location 116 to the center 114 may be used in determining a depth of the object 106B in the scene 106. Similarly, the distance 136 along the sensor 132 from location 118 to the center 114 may be used in determining a depth of the object 106A in the scene 106. The distance along the sensor 132 may be measured in terms of number of pixels of the sensor 132 or a distance (such as millimeters).

In some example implementations, the sensor 132 may include an array of photodiodes (such as avalanche photodiodes) for capturing an image. To capture the image, each photodiode in the array may capture the light that hits the photodiode and may provide a value indicating the intensity of the light (a capture value). The image therefore may be the capture values provided by the array of photodiodes.

In addition, or in the alternative, the sensor 132 may include a complementary metal-oxide semiconductor (CMOS) sensor. To capture the image by a photosensitive CMOS sensor, each pixel of the sensor may capture the light that hits the pixel and may provide a value indicating the intensity of the light. In some example implementations, an array of photodiodes may be coupled to the CMOS sensor. In this manner, the electrical impulses generated by the array of photodiodes may trigger the corresponding pixels of the CMOS sensor to provide capture values.

The sensor 132 may include at least a number of pixels equal to the number of possible light points in the distribution 104. For example, the array of photodiodes or the CMOS sensor may include a number of photodiodes or a number of pixels, respectively, corresponding to the number of possible light points in the distribution 104. The sensor 132 logically may be divided into groups of pixels or photodiodes (such as 4×4 groups) that correspond to a size of a bit of a codeword. The group of pixels or photodiodes also may be referred to as a bit, and the portion of the captured image from a bit of the sensor 132 also may be referred to as a bit. In some example implementations, the sensor 132 may include the same number of bits as the distribution 104.

If the light source 124 emits IR light (such as NIR light at a wavelength of, e.g., 940 nm), the sensor 132 may be an IR sensor to receive the reflections of the NIR light. The sensor 132 also may be configured to capture an image using a flood illuminator (not shown for simplicity). As illustrated, the distance 134 (corresponding to the reflections 110 from the object 106B) is less than the distance 136 (corresponding to the reflections 110 from the object 106A). Using triangulation based on the baseline 112 and the distances 134 and 136, the differing depths of objects 106A and 106B in the scene 106 may be determined in generating depth information for the scene 106. Determining the depths may further include determining a displacement or a distortion of the distribution 104 in the reflections 110.

Although a number of separate components are illustrated in FIG. 1, one or more of the components may be implemented together or include additional functionality. All described components may not be required for a SL system 100, or the functionality of components may be separated into separate components. Additional components not illustrated also may exist. For example, the receiver 108 may include a bandpass filter to allow signals having a determined range of wavelengths to pass onto the sensor 132 (thus filtering out signals with a wavelength outside of the range). In this manner, some incidental signals (such as ambient light) may be prevented from interfering with the captures by the sensor 132. The range of the bandpass filter may be centered at the transmission wavelength for the projector 102. For example, if the projector 102 is configured to emit NIR light with a wavelength of 940 nm, the receiver 108 may include a bandpass filter configured to allow NIR light having wavelengths within a range of, e.g., 920 nm to 960 nm. Therefore, the examples described regarding FIG. 1 are for illustrative purposes, and the present disclosure should not be limited to the example SL system 100.

For a light projector (such as the projector 102), the light source may be any suitable light source. In some example implementations, the light source 124 may include one or more distributed feedback (DFB) lasers. In some other example implementations, the light source 124 may include one or more vertical-cavity surface-emitting lasers (VCSELs).

A DOE is a material situated in the projection path of the light from the light source. The DOE may be configured to split a light point into multiple light points. For example, the material of the DOE may be a translucent or a transparent polymer with a known refractive index. The surface of the DOE may include peaks and valleys (varying the depth of the DOE) so that a light point splits into multiple light points when the light passes through the DOE. For example, the DOE may be configured to receive one or more lights points from one or more lasers and project an intended distribution with a greater number of light points than emitted by the one or more lasers. While the Figures may illustrate the depth of a DOE changing along only one axis of the DOE, the Figures are only to assist in describing aspects of the disclosure. The peaks and valleys of the surface of the DOE may be located at any portion of the surface of the DOE and cause any suitable change in the depth of portions of the DOE, and the present disclosure should not be limited to a specific surface configuration for a DOE.

If the light source 124 includes an array of lasers (such as a VCSEL array), a portion of the distribution of light points may be projected by the array. A DOE may be used to replicate the portion in projecting the distribution of light points. For example, the DOE may split the projection from the array into multiple instances, and a pattern of the projection may be a repetition of the projection from the array. In some example implementations, the DOE may be configured to repeat the projection vertically, horizontally, or at an angle between vertical and horizontal relative to the projection. The repeated instances may be overlapping, non-overlapping, or any suitable configuration. While the examples describe a DOE configured to split the projection from the array and stack the instances above and below one another, the present disclosure should not be limited to a specific type of DOE configuration and repetition of the projection.

Figure 2:
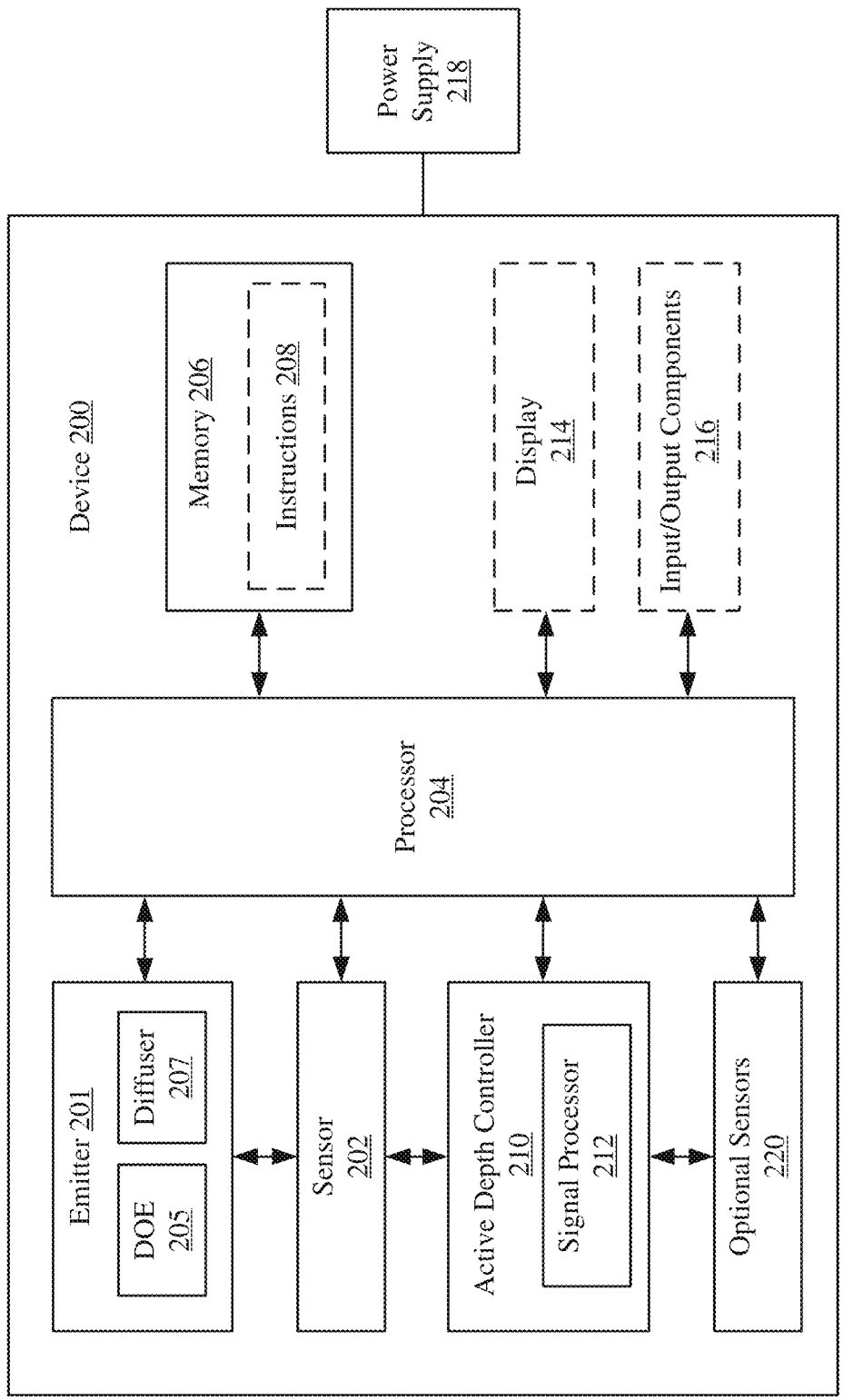
FIG. 2 shows a block diagram of an example device within which aspects of the present disclosure may be implemented.

FIG. 2 shows a block diagram of an example device 200 within which aspects of the present disclosure may be implemented. The device 200 may include or be coupled to an emitter 201, a sensor 202, a processor 204, a memory 206 storing instructions 208, and an active depth controller 210 (which may include one or more signal processors 212). The emitter 201 may include or be coupled to a diffractive optical element (DOE) 205, and may include or be coupled to a diffuser 207. In some implementations, the emitter 201 may include multiple projectors. In addition, or in the alternative, the active depth sensing system may include a flood illuminator component separate from the emitter 201. For purposes of discussion herein, the device 200 may be referred to as a "SL system" or an "active depth sensing system." Further for purposes of discussion herein, the "active depth sensing system" may instead refer to just one or more components of the device 200, such as the active depth controller 210, the emitter 201, the sensor 202, the processor 204, and/or any other appropriate components.

In some implementations, the emitter 201 may be a distributed feedback (DFB) laser for emitting light pulses onto the scene. The DOE 205 may enable the emitter 201 to emit a distribution of light such as a known DOE dot pattern, a codeword DOE projection, a random dot projection or distribution, or the like. The diffuser 207 may transition the device 200 between one or more operating modes. For example, in a transmission mode, the diffuser 207 may be switched on to allow the emitter 201 to emit light pulses into a scene, and in a non-transmission mode, the diffuser 207 may be switched off to prevent the emitter 201 from emitting light pulses into the scene.

In some implementations, the sensor 202 may be a gated, global shutter (GS) sensor configured to receive reflected light pulses from the scene. In some aspects, the sensor 202 may be a composite CMOS image sensor. In some aspects, the sensor 202 may be based on a monolithic pixel array architecture, for example, with Time-Division Multiplexed Read (TDMR) capabilities.

In some implementations, the active depth controller 210 may be a computation element for calculating depth information. In some aspects, the active depth controller 210 may be configured to control (or otherwise operate) one or both of the emitter 201 and the sensor 202. In some aspects, the active depth controller 210 may be controlled, work in conjunction with, or otherwise be operated by one or more other components of the device 200, such as the processor 204 and/or the memory 206.

The device 200 may optionally include or be coupled to a display 214 and a number of input/output (I/O) components 216. The sensor 202 may be, or otherwise may be coupled to, a camera, such as a single camera, a dual camera module, or a module with any number of other camera sensors (not shown for simplicity). The signal processor 212 may be configured to process captures from the sensor 202. The device 200 may further include one or more optional sensors 220 (such as a gyroscope, magnetometer, inertial sensor, NIR sensor, and so on) coupled to the processor 204. The device 200 also may include a power supply 218, which may be coupled to or integrated into the device 200. The device 200 may include additional features or components not shown.

The memory 206 may be a non-transient or non-transitory computer readable medium storing computer-executable instructions 208 to perform all or a portion of one or more operations described in this disclosure. The processor 204 may be one or more suitable processors capable of executing scripts or instructions of one or more software programs (such as instructions 208) stored within the memory 206. In some aspects, the processor 204 may be one or more general purpose processors that execute instructions 208 to cause the device 200 to perform any number of functions or operations. In additional or alternative aspects, the processor 204 may include integrated circuits or other hardware to perform functions or operations without the use of software. While shown to be coupled to each other via the processor 204 in the example of FIG. 2, the processor 204, the memory 206, the active depth controller 210, the optional display 214, the optional I/O components 216, and the optional sensors 220 may be coupled to one another in various arrangements. For example, the processor 204, the memory 206, the active depth controller 210, the optional display 214, the optional I/O components 216, and/or the optional sensors 220 may be coupled to each other via one or more local buses (not shown for simplicity).

The display 214 may be any suitable display or screen allowing for user interaction and/or to present items (such as depth information or a preview image of the scene) for viewing by a user. In some aspects, the display 214 may be a touch-sensitive display. The I/O components 216 may be or include any suitable mechanism, interface, or device to receive input (such as commands) from the user and to provide output to the user. For example, the I/O components 216 may include (but are not limited to) a graphical user interface, keyboard, mouse, microphone and speakers, squeezable bezel or border of the device 200, physical buttons located on device 200, and so on. The display 214 and/or the I/O components 216 may provide a preview image or depth information for the scene to a user and/or receive a user input for adjusting one or more settings of the device 200 (such as adjusting an intensity of emissions by emitter 201, determining or switching one or more operating modes of the device 200, adjusting a field of emission of the emitter 201, and so on).

The active depth controller 210 also may include, or may otherwise be coupled to, a signal processor 212, which may be one or more processors to process captures from the sensor 202. The active depth controller 210 may alternatively or additionally include a combination of specific hardware and the ability to execute software instructions.

The emitter 201 may vary its field of emission for different operating modes. In some example implementations, the emitter 201 may include a focusing apparatus for adjusting the size of the field of emission/transmission. In one example, mirrors attached to actuators (such as microelectromechanical systems (MEMS) actuators) may adjust a focus of the light emissions from the emitter 201. In another example, an adjustable holographic optical element (HOE) may adjust the focus of the light emissions from the emitter 201. In a further example, a formable diffractive optical element (DOE) (such as a piezoelectric material to adjust the shape) may be adjusted to focus the diffracted points of light emitted.

Figure 3:
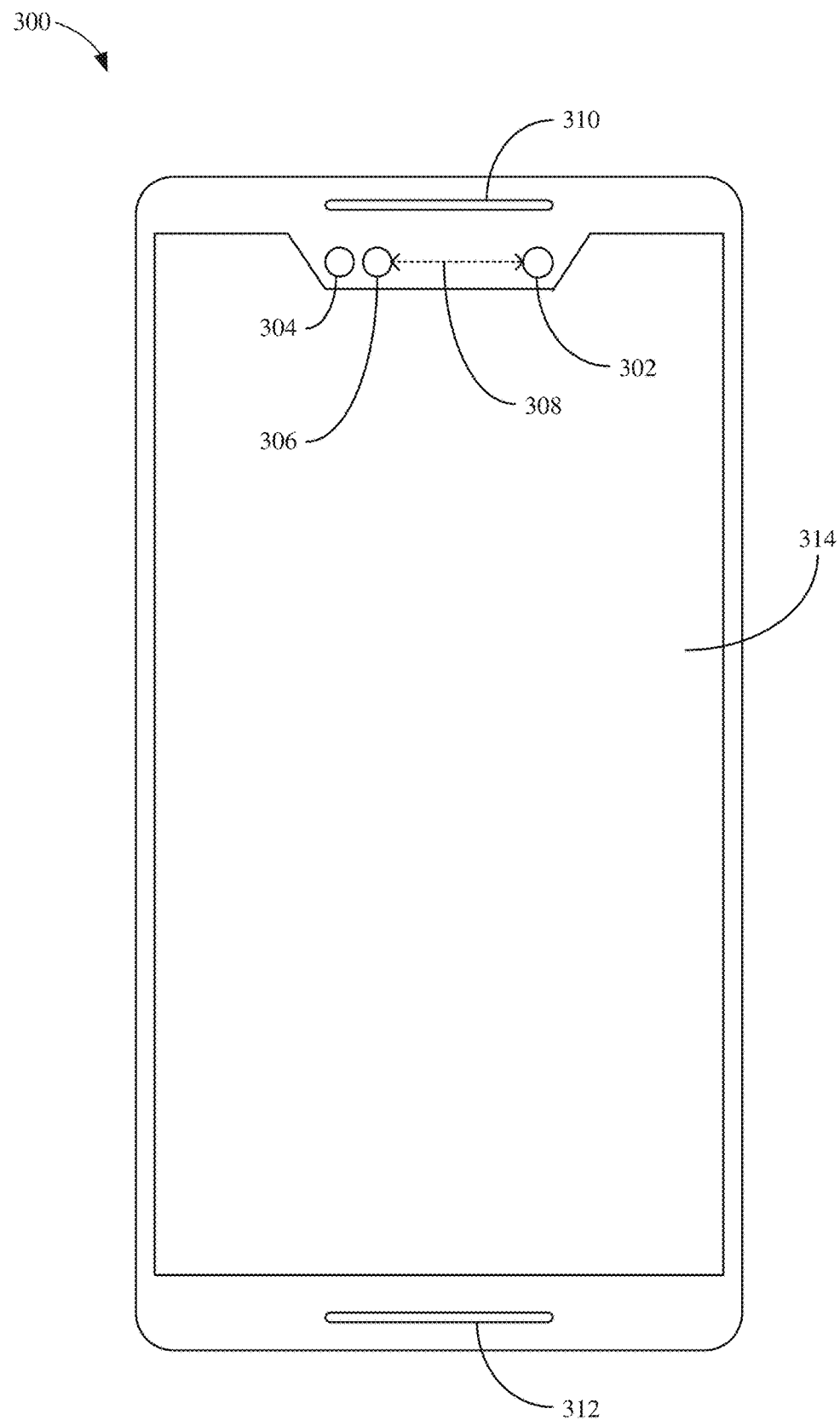
FIG. 3 shows an example device including an active depth sensing system.

FIG. 3 shows an example device 300 including an active depth sensing light projector. In some implementations, the device 300 may be one example of the device 200 of FIG. 2. The device 300 further may include an IR sensor 306 to capture an image based on the reflections of light emitted from the active depth sensing light projector 302 or the flood illuminator 304 (with the active depth sensing light projector 302 and the illuminator 304 projecting IR light). In some example implementations, the active depth sensing light projector 302 may include one or more DFBs for emitting light pulses onto a scene. In some example implementations, the IR sensor 306 may be a gated global shutter (GS) sensor for receiving light pulses reflected from the scene. The active depth sensing light projector 302 and the IR sensor 306 may be separated by a baseline 308.

An example device 300 may be a smartphone, with an earpiece 310 and a microphone 312 for conducting phone calls or other wireless communications. A smartphone also may include a display 314 with or without a notch including the active depth sensing light projectors 302, illuminator 304, and the IR sensor 306. A flood illuminator 304 may project a diffuse IR light onto a scene for the IR sensor 306 to capture an image based on reflections of the diffuse IR light.

Figure 4:
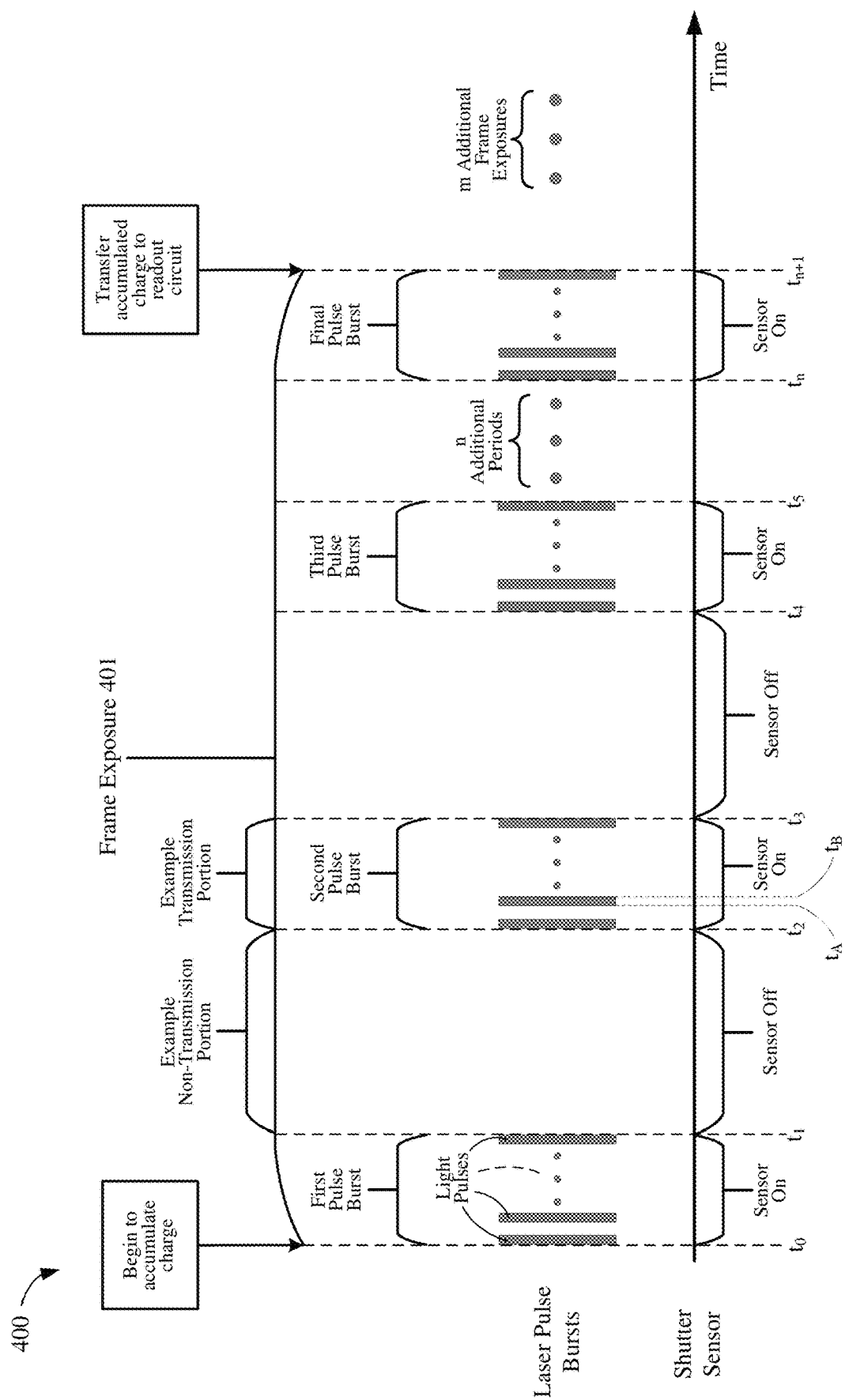
FIG. 4 shows a timing diagram depicting an example operation for sensing a scene.

FIG. 4 shows a timing diagram 400 depicting an example operation for sensing a scene. The example operation may be performed by a device (not shown for simplicity), such as the device 300 of FIG. 3, the device 200 of FIG. 2, or any suitable device. In some implementations, the device may be a mobile phone.

At time $t_0$, the device may begin a frame exposure 401. During the frame exposure 401, the device may illuminate the scene using a sequence of two or more periods. As a non-limiting example, a first period is shown that starts at time to and ends at time $t_2$, and a second period is shown that starts at time $t_2$ and ends at time $t_4$. Each of the two or more periods may include a transmission portion and a non-transmission portion. For purposes of discussion herein, each transmission portion may be referred to as a "pulse burst," and each non-transmission portion may be referred to as a "cooling period."

During each transmission portion of the sequence, such as from time $t_2$ to time $t_3$, the device may emit a plurality of light pulses onto the scene. Each of the light pulses may have a duration, which is shown as a time difference, $t_B$–$t_A$. In some implementations, the device may include one or more lasers (such as the light projector 302 of FIG. 3) for emitting the plurality of light pulses. In some aspects, one or more of the lasers may be a single-mode DFB laser, and each of the plurality of emitted light pulses may be generated by the single-mode DFB laser. The device also may enable one or more sensors, such as the IR sensor 306 of FIG. 3, during each of the transmission portions. The one or more sensors may receive a plurality of light pulses reflected from the scene during each of the transmission portions. In some example implementations, the received light pulses may be reflected from a face of a user of the device. In some aspects, the device may identify or authenticate the face of the user based on the received light pulses.

The sequence includes a number of non-transmission portions between pulse bursts. As a non-limiting example, a first non-transmission portion is shown from time $t_1$ to time $t_2$. Each of the non-transmission portions may correspond to an absence of emitted light (such that the laser does not emit light pulses), for example, so that an operating temperature of the laser may decrease between pulse bursts. The device may prevent or disable the accumulation of photoelectric charge during each non-transmission portion, for example, by disabling the one or more sensors. In this manner, the device may prevent the one or more sensors from receiving ambient light (which may degrade SNR) during the non-transmission portions.

In some implementations, the one or more lasers may emit each of the light pulses at a selected transmit power level that exceeds a maximum specified power level for continuous or long pulse operation of the laser. As the one or more lasers emit the light pulses during the transmission portions, a temperature of the one or more lasers may approach or exceed a specified temperature value at which the one or more lasers may incur physical damage. A duration of each of the non-transmission portions may be selected to prevent damage to the one or more lasers, such as from the operating temperature of the one or more lasers being greater than the specified temperature value during a corresponding one of the transmission portions, by allowing the operating temperature of the one or more lasers to decrease to a level below the specified temperature value. In this manner, each of the non-transmission portions of the sequence may provide a cooling period for a preceding transmissions portion of the sequence. In some aspects, the duration of each non-transmission portion of the sequence may be an order of magnitude greater than the duration of each corresponding transmission portion of the sequence.

Since a gating duration for a traditional single DFB laser may be on the order of approximately tens of nanoseconds, a traditional GS sensor may not be capable of reliably turning on and off during emission that synchronizes with a given light pulse from the DFB laser. Aspects of the present disclosure may enable the GS sensor to be gated and synchronized with each pulse burst from the single DFB laser, for example, so that the device receives reflected light pulses during each transmission portion of the sequence and does not receive any or most of the light (for example, ambient light) during each non-transmission portion of the sequence. As one non-limiting example, the duration of each transmission portion may be approximately 1 µs, and the duration of each non-transmission portion may be approximately 10 µs. Each transmission portion may include approximately 25 light pulses, and the duration (or "pulse-width") of each light pulse may be approximately 20 ns in an appropriate (relatively high) duty cycle, such as approximately 50%. In some aspects, the duty cycle also may adhere to a heat characteristic of the DFB laser. In some aspects, the light pulses may be emitted at a current of approximately 2-3 A. The DFB laser may be configured to emit a number of bursts (approximately 800-3200 in this example) sufficient to saturate the image. In some implementations, the number of pulses in each pulse burst and the number of pulse bursts may be dynamically adjusted based on system conditions, such as a measured SNR, $$\frac{\mu_{sig}}{\sigma_{bg}},$$

where $\mu_{sig}$ represents the laser signal, and where $\sigma_{bg}$ represents the ambient light noise. SNR may be higher when the device is indoors than when the device is exposed to sunlight outdoors. Thus, in some implementations, the device may dynamically adjust at least one of a number of the transmission portions and a number of the plurality of light pulses based on environmental light conditions for the device. For example, the device may dynamically reduce the number of light pulses or the number of transmission portions when the device is indoors (or in other low-light conditions). As another example, the device may dynamically increase the number of light pulses or the number of transmission portions when the device is outdoors (or in other bright-light conditions).

As a non-limiting example, the sequence may include approximately 500-2000 periods, where each period includes a transmission portion and a non-transmission portion. In part by switching the GS sensor on at the beginning of each pulse burst (such as at time $t_0$) and switching the GS sensor off at the end of each pulse burst (such as at time $t_1$), aspects of the present disclosure may allow the single DFB laser to safely operate at a high enough power to illuminate a scene with brightness comparable to an array of VCSELs (e.g., approximately 2-3 W).

The sequence of periods for the frame exposure 401 is shown to include a number, n, of additional periods. Each of the n additional periods may include a corresponding transmission portion and a corresponding non-transmission portion (not shown for simplicity). During an entirety of the sequence (e.g., beginning at time $t_0$), the device may continuously accumulate photoelectric charge indicative of the received light pulses. For example, each of the one or more sensors may be a photodiode configured to continuously receive photons from the received light pulses during each transmission portion of the sequence. The device may be configured to integrate the photoelectric charge to one or more storage nodes of the device, such as the memory 206 of FIG. 2. In some aspects, one or more of the storage nodes may be a charge-coupled device (CCD)-type of storage node (e.g., a storage capacitor). The sequence may continue until enough photoelectrons have been accumulated to form a single image frame, such as at time $t_{n+1}$. In some implementations, the device may integrate the photoelectric charge in a manner similar to the GS pixel architecture disclosed in U.S. Pat. No. 9,332,200 B1.

The sequence (and the frame exposure 401) may end after a final transmission portion (the "final pulse burst") that starts at time $t_n$ and ends at time $t_{n+1}$. In some implementations, the final transmission portion may not be followed by a corresponding non-transmission portion.

After the end of the sequence (e.g., at time $t_{n+1}$), the device may transfer (or "extract") the accumulated photoelectric charge to a readout circuit (not shown for simplicity). In some implementations, the device may readout the photoelectric charge in a manner similar to the GS pixel architecture disclosed in U.S. Pat. No. 9,332,200 B1. In some example implementations, the device may perform a number, m, of additional frame exposures after the frame exposure 401. The device may operate the same or similar to the frame exposure 401 during each of the m additional frame exposures.

Figure 5:
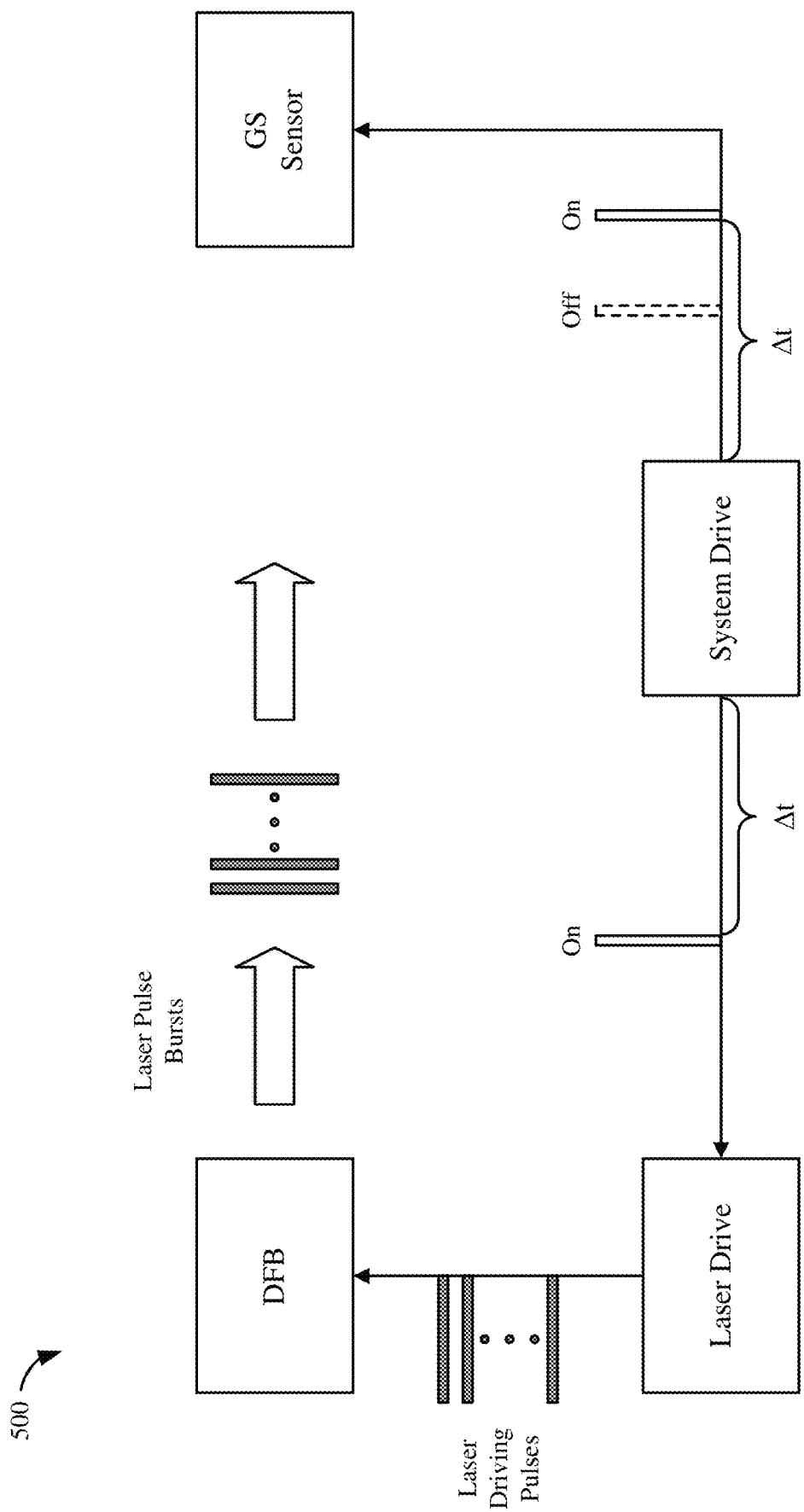
FIG. 5 shows an example system for sensing a scene.

FIG. 5 shows an example system 500 for sensing a scene. The example system 500 is shown to include a DFB, a GS Sensor, a Laser Drive, and a System Drive. The DFB may be an example implementation of the one or more lasers (e.g., a single DFB laser) described with respect to FIG. 4. The GS Sensor may be an example implementation of the one or more sensors (e.g., a GS sensor) described with respect to FIG. 4. The System Drive may be configured to turn the Laser Drive on by sending "On" triggers to the Laser Drive. When the Laser Drive is on, it may send laser driving pulses to the DFB, and the DFB may emit corresponding light pulses in a sequence of laser pulse bursts, as described with respect to FIG. 4. The System Drive also may be configured to enable the GS Sensor by sending an "On" trigger to the GS Sensor. The System Drive also may optionally send an "Off" trigger to switch the GS sensor off at the end of each laser pulse burst. In addition, or in the alternative, the GS sensor may be timed to turn off after a particular duration of the length of the pulse burst, such as approximately 1 µs. The System Drive may send the same system "On" trigger simultaneously (as indicated by Δt) to each of the Laser Drive and the GS Sensor. Thus, at the beginning of each laser pulse burst, the GS sensor may be triggered and turned on. As discussed with respect to FIG. 4, the DFB may thus safely emit the pulse train at a power level sufficient to illuminate the scene as brightly as an array of VCSELs, and at the same time, the system may minimize SNR degradation from ambient light noise by gating the GS sensor to synchronize with the on time for each burst of the pulse train.

Figure 6:
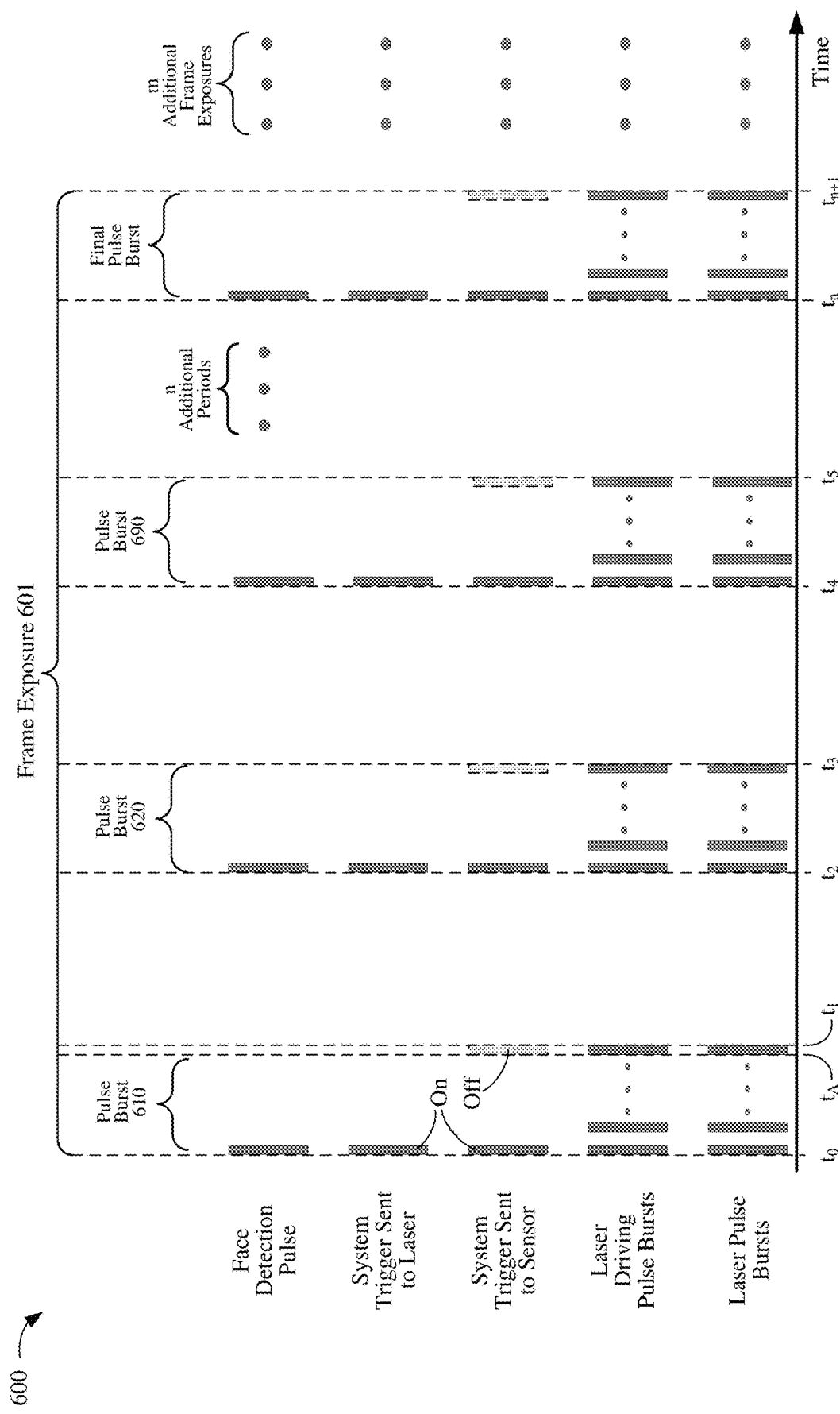
FIG. 6 shows a timing diagram depicting an example operation for controlling an active depth sensing system.

FIG. 6 shows a timing diagram 600 depicting an example operation for controlling an active depth sensing system. The example operation may be performed by a device (not shown for simplicity), such as the device 300 of FIG. 3, the device 200 of FIG. 2, or any suitable device. In some implementations, the device may be a mobile phone. The timing diagram 600 may be similar to the timing diagram 400 of FIG. 4. For example, a frame exposure 601, a pulse burst 610, a pulse burst 620, a pulse burst 690, a time $t_0$, a time $t_1$, a time $t_2$, a time $t_3$, a time $t_4$, a time $t_5$, a time $t_n$, a time $t_{n+1}$, and m additional frame exposures may be the same or similar to the frame exposure 401, the first pulse burst, the second pulse burst, the third pulse burst, the final pulse burst, the time $t_0$, the time $t_1$, the time $t_2$, the time $t_3$, the time $t_4$, the time $t_5$, the time $t_n$, the time $t_{n+1}$, and the m additional frame exposures of FIG. 4. "Laser Pulse Bursts" are shown that are the same or similar to the laser pulse bursts shown in FIG. 4. FIG. 6 also shows corresponding "Laser Driving Pulse Bursts" that trigger the laser pulse bursts, as described with respect to FIG. 5. As described with respect to FIG. 4 and FIG. 5, a GS sensor may be triggered to turn on in-sync with the beginning of the laser pulse bursts (e.g., via the simultaneous "On" triggers at time $t_0$). The GS sensor also may optionally be triggered to turn off in-sync with the end of the laser pulse bursts (e.g., via the "Off" trigger at time $t_4$).

Figure 7:
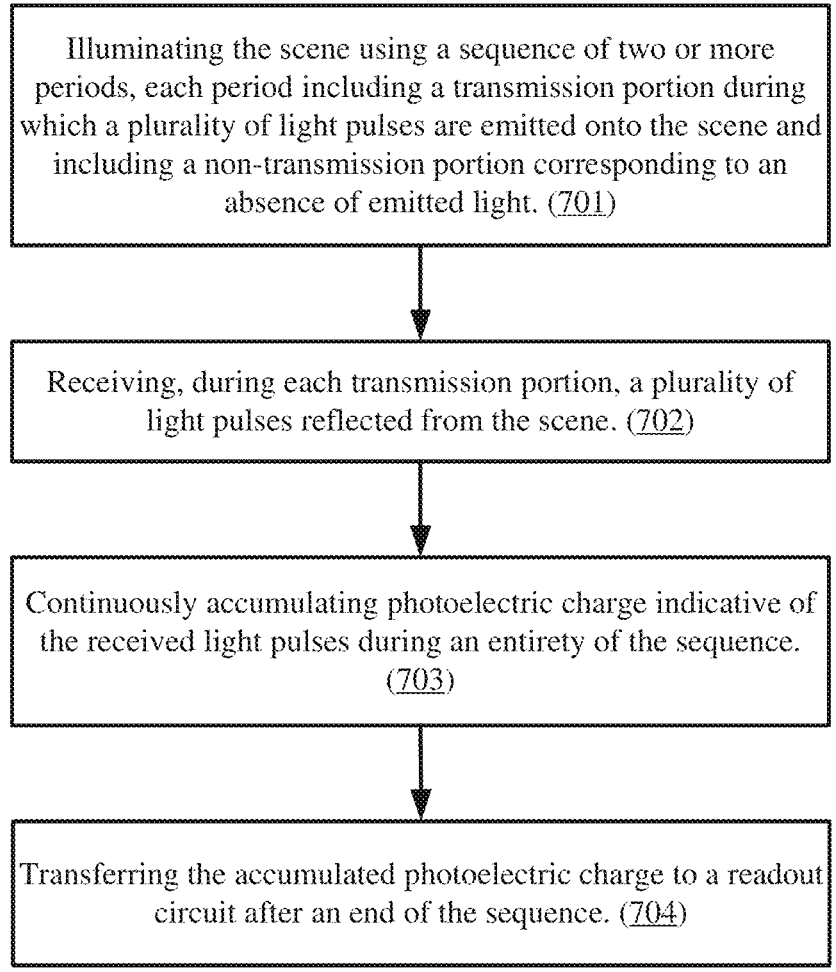
FIG. 7 shows an illustrative flowchart depicting an example operation for sensing a scene.

FIG. 7 shows an illustrative flowchart depicting an example operation 700 for sensing a scene. The example operation 700 is performed by a device, such as the device 200 of FIG. 2. The device illuminates the scene using a sequence of two or more periods, each period including a transmission portion during which a plurality of light pulses are emitted onto the scene and including a non-transmission portion corresponding to an absence of emitted light (701). Each of the emitted light pulses is emitted from a single-mode distributed feedback (DFB) laser at a selected transmit power level. In some implementations, a duration of each non-transmission portion is based at least in part on the selected transmit power level. In addition, or in the alternative, the duration of each non-transmission portion is selected to prevent damage to the laser based on the operating temperature of the laser being greater than the temperature value during a corresponding one of the transmission portions. In some aspects, the selected transmit power level exceeds a maximum specified power level for continuous operation of the laser.

The device receives, during each transmission portion, a plurality of light pulses reflected from the scene (702). In some implementations, a sensor may continuously receive photons during each transmission portion of the sequence, and may be prevented from receiving ambient light during each non-transmission portion of the sequence.

The device continuously accumulates photoelectric charge indicative of the received light pulses during an entirety of the sequence (703). In some implementations, the device may pause or disable the accumulation of photoelectric charge during each non-transmission portion of the sequence.

The device transfers the accumulated photoelectric charge to a readout circuit after an end of the sequence (704). In some implementations, the transferred accumulated photoelectric charge may be used to construct an image of the scene. In some aspects, the image may be a face of a user to be identified or authenticated by a mobile device such as a smartphone.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method for sensing a scene, comprising:
    illuminating, using at least one light source, the scene using a sequence of two or more periods, each period including a respective transmission portion during which a plurality of light pulses are emitted onto the scene and including a respective non-transmission portion corresponding to an absence of emitted light, wherein a first non-transmission portion of a first period occurs after a first plurality of light pulses of the first period and before a second plurality of light pulses of a second period, wherein each light pulse of the plurality of emitted light pulses is emitted from the at least one light source at a selected transmit power level, and wherein a duration of each non-transmission portion is based at least in part on the selected transmit power level at which each light pulse is emitted;
    receiving, by a sensor during each transmission portion, a plurality of light pulses reflected from the scene; and
    continuously accumulating, by the sensor, photoelectric charge indicative of the plurality of received light pulses during an entirety of the sequence including a plurality of transmission portions and a plurality of corresponding non-transmission portions.

2. The method of claim 1, further comprising:
    transferring the accumulated photoelectric charge to a readout circuit after an end of the sequence.

3. The method of claim 1, wherein the receiving comprises:
    configuring a photodiode to continuously receive photons during each transmission portion of the sequence.

4. The method of claim 1, further comprising:
    disabling the sensor during each non-transmission portion of the sequence to prevent reception of ambient light during each non-transmission portion of the sequence.

5. The method of claim 4, wherein the preventing comprises:
disabling the accumulation of photoelectric charge during each non-transmission portion of the sequence.

6. The method of claim 1, wherein the at least one light source includes a single-mode distributed feedback laser (DFB), and wherein each of the plurality of emitted light pulses is generated by the single-mode DFB.

7. The method of claim 1, wherein the duration of each non-transmission portion of the sequence is an order of magnitude greater than a duration of each transmission portion of the sequence.

8. The method of claim 1, wherein the plurality of emitted light pulses are emitted from the at least one light source, and the sequence is based on a heat characteristic of the at least one light source.

9. The method of claim 8, wherein the heat characteristic comprises a temperature value, and wherein the duration of each non-transmission portion is selected to prevent damage to the at least one light source based on a temperature of the at least one light source being greater than the temperature value during a corresponding transmission portion of a plurality of transmission portions of the sequence.

10. The method of claim 1, wherein the selected transmit power level exceeds a maximum specified power level for continuous wave of the at least one light source, and wherein the duration of each non-transmission portion is based at least in part on the selected transmit power level exceeding the maximum specified power level for continuous wave of the at least one light source.

11. The method of claim 1, wherein the plurality of emitted light pulses are emitted from a mobile phone including at least one front-facing camera.

12. The method of claim 11, wherein the plurality of received light pulses are reflected from a face of a user of the mobile phone.

13. The method of claim 12, further comprising:
identifying or authenticating the face of the user based on the plurality of received light pulses.

14. The method of claim 1, further comprising:
dynamically adjusting at least one transmission portion of a plurality transmission portions of the sequence or a number of the plurality of emitted light pulses based on environmental light conditions.

15. An apparatus for sensing a scene, comprising:
a memory;
at least one light source configured to illuminate a scene using a sequence of two or more periods, each period including a respective transmission portion during which a plurality of light pulses are emitted onto the scene and including a respective non-transmission portion corresponding to an absence of emitted light, wherein a first non-transmission portion of a first period occurs after a first plurality of light pulses of the first period and before a second plurality of light pulses of a second period, wherein each light pulse of the plurality of emitted light pulses is emitted from the at least one light source at a selected transmit power level, and wherein a duration of each non-transmission portion is based at least in part on the selected transmit power level at which each light pulse is emitted; and
at least one sensor configured to:
receive, during each transmission portion, a plurality of light pulses reflected from the scene; and
continuously accumulate photoelectric charge indicative of the plurality of received light pulses during an entirety of the sequence including a plurality of transmission portions and a plurality of corresponding non-transmission portions.

16. The apparatus of claim 15, further comprising a processor configured to:
transfer the accumulated photoelectric charge to a readout circuit after an end of the sequence.

17. The apparatus of claim 15, further comprising a processor, wherein, to receive the plurality of light pulses, the processor is configured to:
configure a photodiode of the at least one sensor to continuously receive photons during each transmission portion of the sequence.

18. The apparatus of claim 15, further comprising a processor configured to:
disable the sensor during each non-transmission portion of the sequence to prevent reception of ambient light during each non-transmission portion of the sequence.

19. The apparatus of claim 18, wherein, to prevent reception of ambient light, the processor is configured to:
disable the accumulation of photoelectric charge during each non-transmission portion of the sequence.

20. The apparatus of claim 15, wherein the at least one light source includes a single-mode distributed feedback laser (DFB) configured to emit the plurality of light pulses.

21. The apparatus of claim 15, wherein the duration of each non-transmission portion is an order of magnitude greater than a duration of each transmission portion.

22. The apparatus of claim 15, wherein the selected transmit power level exceeds a maximum specified power level for continuous wave of the at least one light source, and wherein the duration of each non-transmission portion is based at least in part on the selected transmit power level exceeding the maximum specified power level for continuous wave of the at least one light source.

23. The apparatus of claim 15, wherein the plurality of emitted light pulses are emitted from the at least one light source, and the sequence is based on a heat characteristic of the at least one light source.

24. The apparatus of claim 23, wherein the heat characteristic comprises a temperature value, and wherein the duration of each non-transmission portion is selected to prevent damage to the at least one light source based on a temperature of the at least one light source being greater than the temperature value during a corresponding transmission portion of a plurality of transmission portions of the sequence.

25. The apparatus of claim 15, wherein the apparatus comprises a mobile phone including at least one front-facing camera.

26. The apparatus of claim 25, wherein the plurality of received light pulses are reflected from a face of a user of the mobile phone.

27. The apparatus of claim 26, further comprising a processor configured to:
identify or authenticate the face of the user based on the plurality of received light pulses.

28. The apparatus of claim 26, further comprising a processor configured to:
dynamically adjust at least one transmission portion of a plurality transmission portions of the sequence or a number of the plurality of emitted light pulses based on environmental light conditions.

* * * * *